United States Patent [19]
Kaunzinger et al.

[11] 3,812,419
[45] May 21, 1974

[54] ELECTRONIC FIELD MILL
[75] Inventors: Helmuth M. Kaunzinger, Neptune; Rudolf G. Buser, Wall, both of N.J.
[73] Assignee: The United States of America as represented by the Secretary of the Army, Washington, D.C.
[22] Filed: Mar. 5, 1973
[21] Appl. No.: 337,794

[52] U.S. Cl. .................. 324/32, 324/72, 324/109
[51] Int. Cl. ............................................. G01r 5/28
[58] Field of Search ............. 324/32, 72, 72.5, 109, 324/123

[56] References Cited
UNITED STATES PATENTS
3,443,224  5/1969  Kramer et al. ................. 324/72.5
3,256,481  6/1966  Pulvari ............................ 324/32
3,612,990  10/1971  Del Duca ...................... 324/109 X Primary Examiner—Stanley T. Krawczewicz
Attorney, Agent, or Firm—Edward J. Kelly; Herbert Berl

[57] ABSTRACT

This invention relates to electrostatic fields and particularly to instruments for measuring the strength of electrostatic fields. More particularly this disclosure describes a device using electronic means for modulating the strength of an electrostatic field in front of a sensing electrode to simulate the field-mill effect and produce alternating voltage components resulting in an average voltage shift proportional to the field strength at that point. This average voltage shift is amplified and applied to a suitable means to indicate the relative field strength.

5 Claims, 2 Drawing Figures

PATENTED MAY 21 1974  3,812,419

ELECTRONIC FIELD MILL

BACKGROUND OF THE INVENTION

Electrostatic fields are generated in a well known manner and charges are built up on many types of moving equipment. On some equipment, such as moving aircraft, the electrostatic fields can reach extremely high values and can become hazardous as the aircraft approaches ground — or an oppositely-charged body. It becomes necessary to provide a means for measuring the strength of the electrostatic field between a given object and an adjacent object or ground to determine whether or not the electrostatic voltage is at a dangerous level and whether or not some means should be employed to discharge the object before any harm is done.

There are some known methods for measuring the strength of an electrostatic field. The best known are devices of the electrometer type that have very light, fragile vanes that repel each other and separate when charged to give an indication of the charge voltage. These electrometers are mainly laboratory devices and are cumbersome, as well as fragile, and would not work well, if at all, in a moving vehicle.

For moving vehicles, the field mill has been the best available means for measuring an electrostatic field. The field mill makes use of a rotating vane alternately exposing and shielding an electrostatic field-sampling probe by mechanical means. This method produces a pulsating voltage on the probe that is proportional to the field strength and that can be readily amplified and applied to a device that indicates the relative field strength.

The angular velocity of these vanes is limited by the maximum revolution per time unit obtainable from a motor. There are inescapable mechanical problems such as those of bearings, particularly when intended for use in a vacuum (interplanetary space applications) where lubrication is difficult. Motors are relatively bulky and require a relatively large power to turn the field mill vanes, in comparison to the small power required to operate an electrometer amplifier and indicate the strength of the field. Shutter type apertures may also be used to modulate the electrostatic field but these have even greater problems such as those of friction between the leaves and reduced longivity.

SUMMARY OF THE INVENTION

The subject invention overcomes these problems by the use of a charged, grid-shaped electrode that affects an electrostatic field in the vicinity of a sampling probe to provide a means for measuring the field. A voltage, controlled by a modulator, is applied to this grid-shaped electrode for periodically changing the electrostatic transparency between the external electrostatic field and the electrostatic-field sampling probe. This grid-shaped electrode is subsequently referred to as "electronic aperture". The sampling probe is located behind this electronic aperture and is connected to an electrometer amplifier driving an indicator for the relative external field strength. This electrostatic field measuring device, employing a rapidly changing electronic aperture between the unknown field and the sampling probe, can have a very much higher frequency of modulation, in comparison to that of the mechanically-operated vanes of a field mill. It also has a very much lower power consumption, a smaller overall size and a higher system efficiency than other available electrostatic-field measuring devices and it has no mechanical problems.

DESCRIPTION OF THE PREFERRED EMBODIMENT

Figure 1:
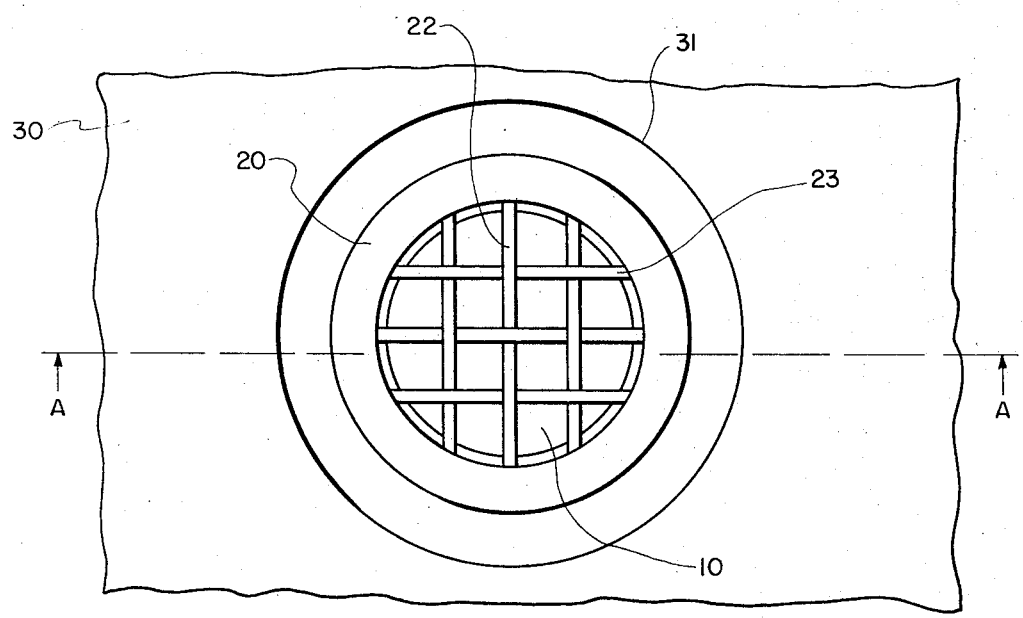
FIG. 1 shows a plan view of a typical electronic field mill according to this invention.

Referring now more particularly to FIG. 1, a plan view of the subject device seen from above, shows a top surface 10 of a probe positioned beneath an electronic aperture having grid electrodes 22 and 23 etc. that are attached to an enclosure 20 that is mounted within, but separated or insulated from the edge 31 of a shell 30 of a reference surface.

Figure 2:
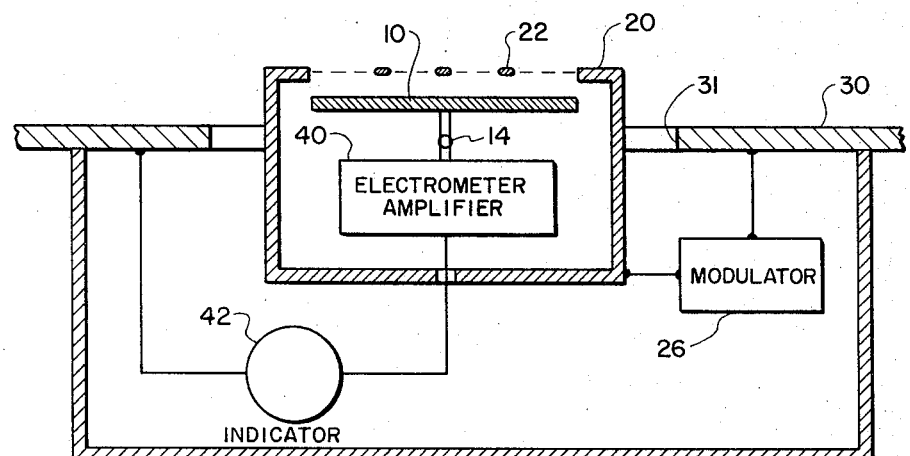
FIG. 2 shows a cross section of the same device.

FIG. 2 shows a cross-section of the same device along the lines A-A and has similar elements similarly numbered. FIG. 2 shows the top surface 10 of the probe, the electronic aperture with enclosure 20, the grids 22 in the enclosure 20 within the edge 31 of the reference shell 30. FIG. 2 also shows the opposing end 14 of the probe connected to an electrometer amplifier 40 whose output is connected to an indicator 42. A modulator 26 is connected between the shell 30 and the enclosure 20.

In operation, the surface of the probe 10 is oriented towards the surface of any body having an unknown charge with respect to the reference surface 30. This surface can be the ground when this instrumentation is located above ground to measure charges with respect to ground. The electric charge on the surface 10 of the probe varies with the momentary penetration of the electrostatic field, originating at the adjacent surface of the object with the unknown charge or ground, to the probe surface. The opposite end 14 of the probe is connected to the electrometer amplifier 40.

The effective area of the probe varies with the penetration of the external electrostatic field through the electronic aperture formed by the electrodes 22 and 23. This aperture varies with the magnitude and polarity of the potential applied to these electrodes. This potential is varied by the signal from the modulator 26, and the effective electrostatic field acting on the surface 10 corresponds with this variation. If the modulation is a sinusoidal voltage, square wave, or any other periodic voltage waveforms, the induced charge separation between locations 10 and 14 on the probe varies at the same rate about the level imposed by the external field without modulation. If the modulation is constant, this alternating voltage, effective at the amplifier input 14, will be proportional to the sum of modulating and external fields. Since the effects of the modulating field can be calculated or filtered out, the unknown external field component can be electronically separated, amplified and displayed. Therefore the voltage developed at 14 must be amplified by an electrometer amplifier such as 40 whose processed or demodulated output can be applied to any device to indicate the relative strength of the electrostatic field.

This output may also be used to control any available devices to dissipate charges in general and in particular electrostatic charges, on a vehicle or aircraft, to a safe amount with respect to the ground or other body.

The probe and its electronic aperture are shown positioned substantially coplanar with the shell 30 of an aircraft, although any position where the shell does not interfere with the measurement of the external electrostatic field would be suitable.

The probe shown has a flat surface 10 although the surface can be arched or have any other form for varying the viewing angle towards the directions where electrostatic fields exist.

A circular boundary is used here for the probe and the electronic aperture since charges induced on electrodes surfaces are proportional to area and this is the most effective area utilization with a given diameter. Square or elongated shapes may be used in specific cases where such shapes would be desirable, or necessary, to cover other exposure cases or to modify the dynamic range of the device to a logarithmic response.

The size of this device may be chosen for the most effective operation, for minimum size, and weight, or for maximum efficiency where this is desirable.

The electrodes 22 and 23 of the electronic aperture are shown here as cross woven wires, and, since they function much like grids, they could have a size, shape, and conformation similar to those of grid electrodes. Other shapes and configurations of such lattice or grid networks will suggest themselves to one skilled in the art. The material used for such grid wires would depend on the physical strength needed as well as the exposure to elements that may be involved. The probe and electronic aperture should be made of conducting material.

The electrometer amplifier 40 may be any of the well known types that are available with high enough input impedance and sufficient gain to transform the charge components induced on surface 10 and point 14 into a signal of sufficient strength to be applied to the indicator 42. Means for separating the external field component from the modulating component at the output can be accomplished with any suitable method of signal processing and demodulation. As the modulating voltage on the electronic aperture may also be used to gate certain portions of the electrometer amplifier, a narrow bandwidth may be accomplished to eliminate noise components and to achieve higher sensitivity and greater noise immunity in comparison to motor operated field mills.

The indicator 42 may be a conventional display device or the amplified signal may be applied to a solenoid or switch to control other devices to reduce the electrostatic charge when it becomes greater than a safe amount.

The modulator 26 may be of any suitable type capable of producing voltage changes of sufficient amplitude to provide an adequate control of the electronic aperture.

The reference surface 30 shown here could be the ground or the surface of an aircraft or a missile or any other object that may build up an electrostatic charge to a dangerous level. The enclosure 20 must be separated or insulated from the shell or surface 30 since it must be modulated with respect to the probe 10, which is basically at the average potential at the reference plane 30 in the absence of an external field from a charged surface.

It should be understood, of course, that the foregoing disclosure relates to only a preferred embodiment of the inentive process and that numerous modifications or alterations may be made without departing from the spirit and scope of the invention as set forth in the appended claims.

What is claimed is:

1. A device for measuring the strength of an electrostatic field near a surface area of a body facing in a particular direction comprising:
   a sensing probe fixedly positioned near said surface area of said said body and having a sensing surface area facing as said surface area of said body;
   a conductive grid means positioned in front of said sensing surface of said probe;
   a conductive shielding enclosure conductively connected to the periphery of said grid means and enclosing said probe;
   modulating means connected between said shielding enclosure and said grid means, in common, and to said body to modulate the electrostatic field strengths sensed by said probe;
   means connected to said probe for amplifying signals corresponding to modulated electrostatic field strengths at said probe; and
   indicator means connected between the output of said amplifying means and said body.

2. A device as in claim 1 wherein said sensing surface is substantially flat.

3. A device as in claim 1 wherein said sensing surface is substantially coplanar with the nearby surface area of said body.

4. A device as in claim 3 wherein said shielding enclosure is positioned in an opening in said surface area of said body.

5. A device as in claim 1 wherein said means for amplifying the modulated signals comprises an electrometer amplifier.

* * * * *